(12) United States Patent
Bentz

(10) Patent No.: US 10,912,280 B2
(45) Date of Patent: Feb. 9, 2021

(54) PET TOY

(71) Applicant: Elizabeth Bentz, Denver, CO (US)

(72) Inventor: Elizabeth Bentz, Denver, CO (US)

( * ) Notice: Subject to any disclaimer, the term of this patent is extended or adjusted under 35 U.S.C. 154(b) by 232 days.

(21) Appl. No.: 16/264,551

(22) Filed: Jan. 31, 2019

(65) Prior Publication Data

US 2020/0245591 A1    Aug. 6, 2020

(51) Int. Cl.
*A01K 15/02* (2006.01)
*G10K 9/00* (2006.01)

(52) U.S. Cl.
CPC .............. *A01K 15/025* (2013.01); *G10K 9/00* (2013.01)

(58) Field of Classification Search
CPC . A63H 13/00; A63H 3/06; A63H 3/31; A63H 5/00; A01K 15/025; G10K 9/00
See application file for complete search history.

(56) References Cited

U.S. PATENT DOCUMENTS

| 2015/0230429 A1* | 8/2015 | Mak ..................... A01K 15/025 119/709 |
| 2019/0327936 A1* | 10/2019 | Millward ............. A01K 15/025 |
| 2020/0085016 A1* | 3/2020 | Millward ............. A01K 15/025 |

* cited by examiner

*Primary Examiner* — Timothy D Collins
*Assistant Examiner* — Brittany A Lowery

(57) ABSTRACT

The invention is a single piece molded toy that is shaped like an animal wherein the center of the toy is in the shape of and accordion and a squeaker in the head portion makes sound when the toy is squeezed, and as the toy returns to its original state a grunter located in the rear of the toy makes a grunting sound similar to that of a pig.

5 Claims, 6 Drawing Sheets

PET TOY

FIELD

The present invention relates generally to stimulating, encouraging and motivating games and methods of playing regarding pets, e.g. dogs and cats. More particularly, the invention relates to motivational games, toys and methods for assessing the pet training skills in the form of games or puzzles that incite pet interaction and memory skills.

PRIOR ART

There are many types of pet toys on the market that squeak or that can be used in a tug-of-war game between an owner and a dog, or multiple dogs without their owner's interaction. This novel molded accordion style toy is designed to provide pets of all sizes an appealing interaction with the toy and produces two distinct sounds.

BRIEF DESCRIPTION OF THE INVENTION

The novel design of the inventive toy provides a squeaking sound when the molded accordion section is compressed. Based on the molded accordion shape, the toy will naturally return to its original or resting state when manual compression ceases. As the toy decompresses, a grunter is activated at the back end of the toy and produces a grunting sound similar to that of a pig when the toy refills with air.

The object of the present invention is to motivate and maintain interest of a pet. The act of compressing the toy allows air to be sucked in through a reed squeaking with toning wedge located at the front of the toy beneath the head portion. During this activity the toy squeaks.

Since the molded shape will naturally expand and return to its uncompressed or resting state, the release of air is then driven through a grunter embedded in the rear of the toy. During this activity the toy grunts. While the toy appears fairly simple in design, it is novel in its operation, and the two different sounds that emit when the toy is compressed and decompresses. The body is a single molded piece which aids in durability and an embodiment includes poly-fill contained in the head and rear portion of the toy.

BACKGROUND OF THE INVENTION

The invention most closely corresponds with USPTO Class 119/707 wherein Class 119 relates to animal husbandry and sub-class 707 includes toys.

In its simplest form, the invention relates to a novel toy for pets wherein two distinct sounds are produced via a molded accordion toy, containing a squeaker and a grunter, wherein the body is primarily hollow.

THE INVENTION

Summary, Objects and Advantages

It well known that pets do experience a sense of boredom, and if not addressed, may manifest in negative behavior such as chewing furniture or going to the bathroom in undesirable locations in the pet owner's home. The inventive toy is designed to capture and retain a pet's interest whether the pet owner is away or home. The pet owner can manipulate the toy in some way to actively play with the pet as well. The toy is not designed to "replace" human interaction, but rather to help keep a pet entertained even if the owner is not also interacting with the toy and pet.

BRIEF DESCRIPTION OF THE DRAWINGS

The invention is described in further detail by reference to six (6) drawings sufficient in detail to describe the invention in which.

DETAILED DESCRIPTION, INCLUDING BEST MODES OF CARRYING OUT THE INVENTION

Figure 1:
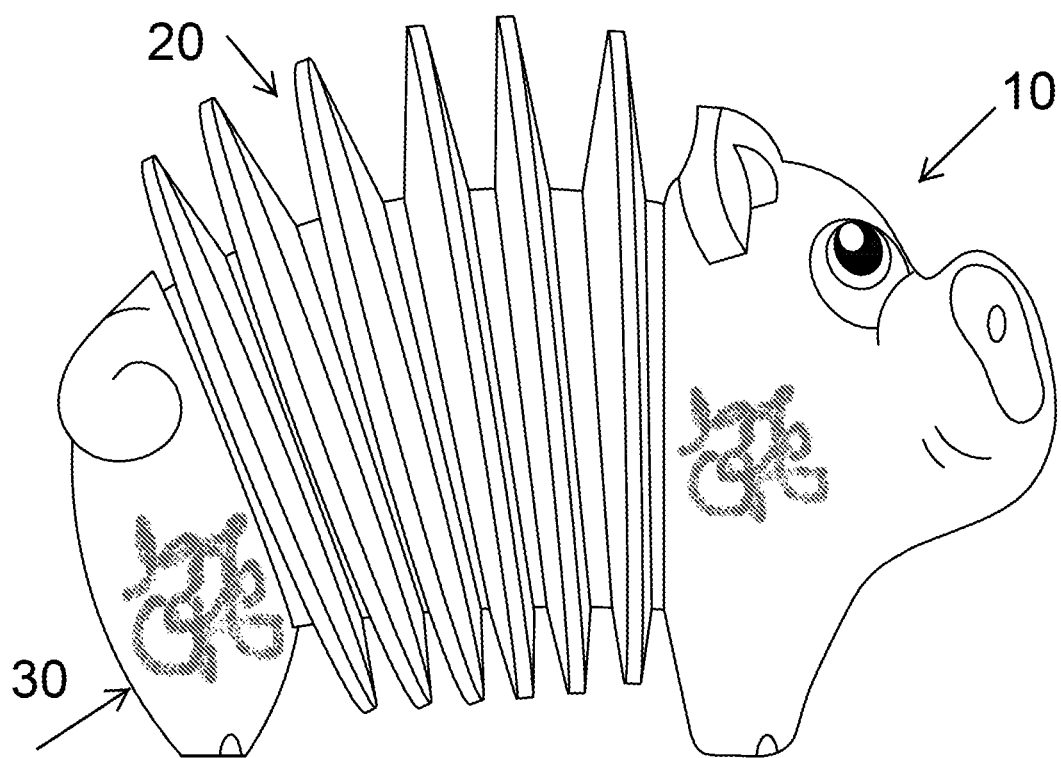
FIG. 1 is an illustration of the accordion toy body.

FIG. 1 shows the molded plastic animal shape 10 with the accordion mid-section 20. The body is hollow and molded into a single piece. The center of the toy is a molded accordion shape 20 which allows the toy to be compressed so that the sections of the accordion fit together and cause air to be expelled from the toy via the mechanisms explained below. The toy can be filled with a poly-fill 30 at the head and rear end of the toy.

Figure 2:
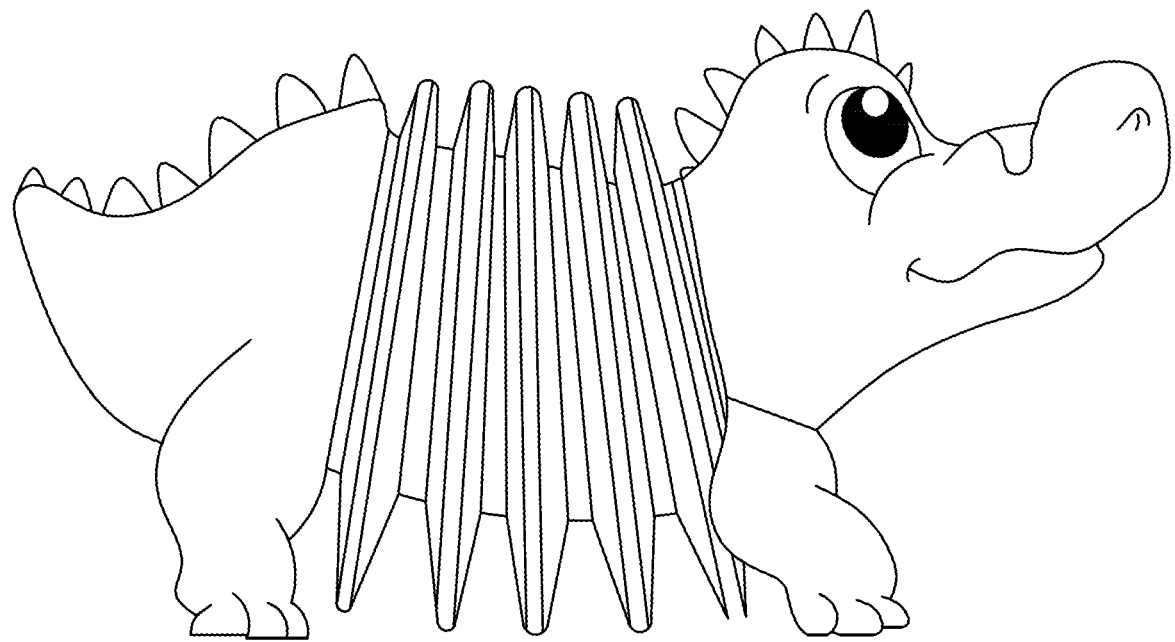
FIG. 2 is an example of an alternate embodiment using a different animal shape.

FIG. 2 is an example of another embodiment to illustrate that the molded body of the toy can be made as varying animal shapes and still accomplish a similar function.

Figure 3:
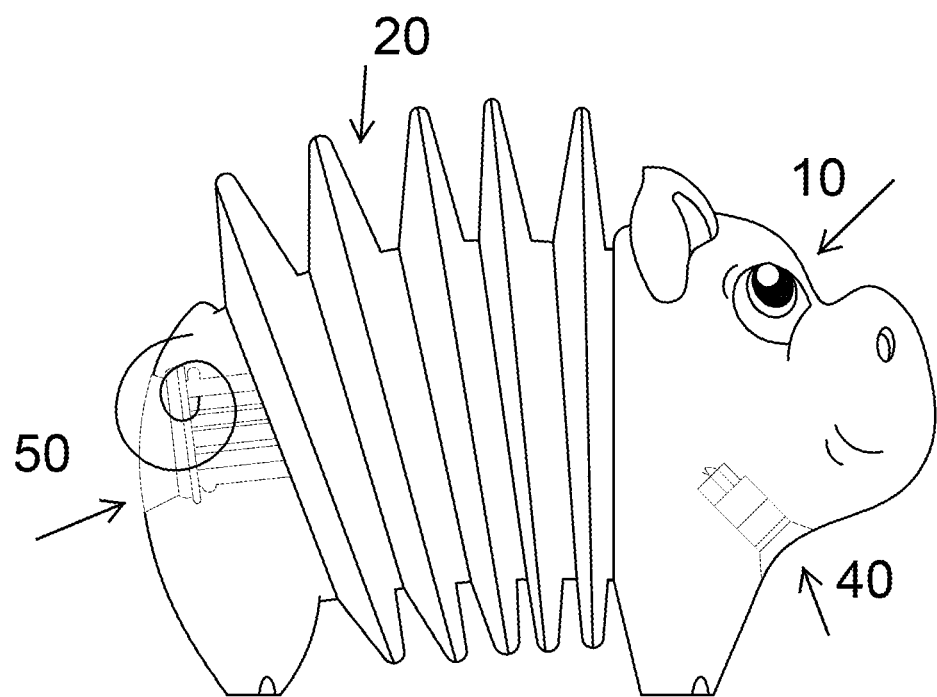
FIG. 3 is a side perspective of the accordion toy showing the squeaker and grunter.
Figure 4:
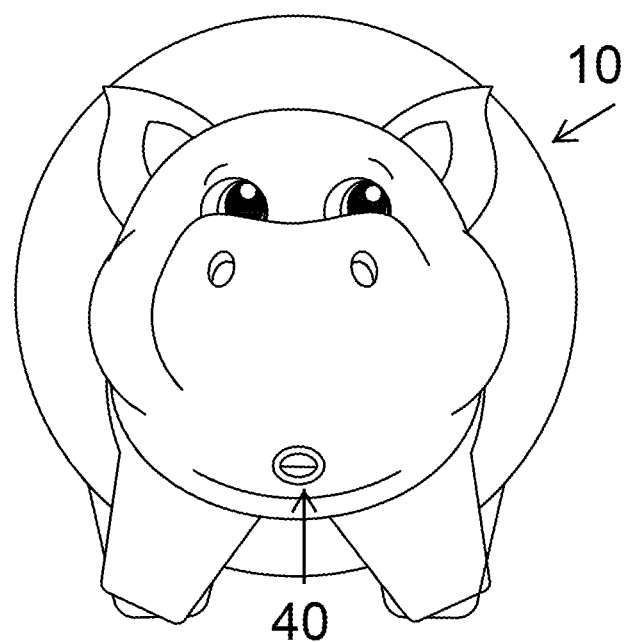
FIG. 4 is front perspective of the toy showing the squeaker.

FIG. 3 is a side view of the accordion toy 10 and shows the squeaker 40 and the grunter 50 from a side perspective. The squeaker has a toning wedge to create the squeaking sound when the toy is compressed and the accordion sections nest inward upon one another. As the intake of air into the toy occurs, the squeaker is activated to make a squeaking sound FIG. 4 is a front perspective of the accordion toy again displaying the molded toy body 10. On the front of the toy the squeaker 40 is located just under the face of the animal.

Figure 5:
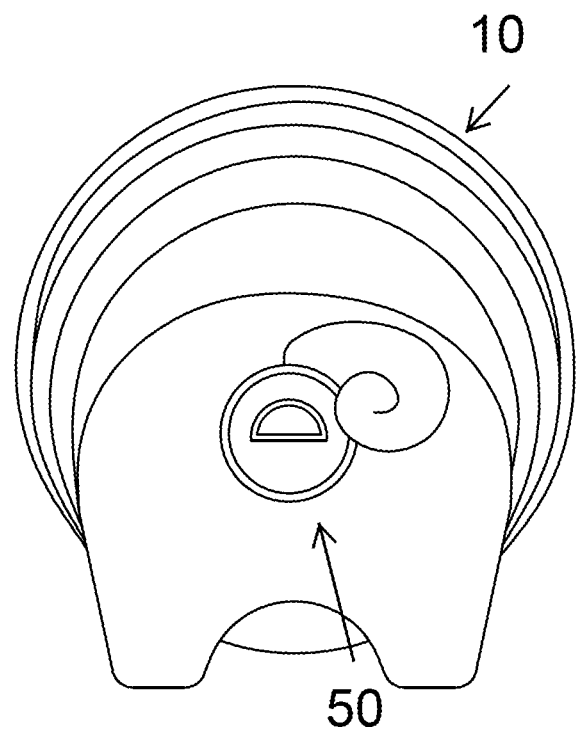
FIG. 5 is a rear perspective the toy showing the grunter.

FIG. 5 is a rear perspective of the toy body 10 showing the grunter 50 located on the rear end of the animal shape. The grunter is activated as the toy returns to its initial uncompressed state when air is pulled inward through the grunter. Since the body is molded using the accordion shape, the toy will naturally expand back to what is considered a resting or uncompressed state. The grunter is activated only by intake of air whereas the squeaker is activated by air expulsion. The grunter does as the term sounds—creates a grunting noise similar to that of a pig and helps to retain a pet's interest.

Figure 6:
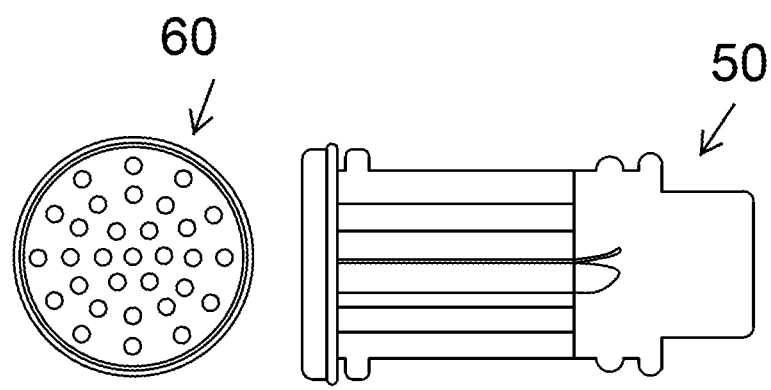
FIG. 6 illustrates the grunter.

FIG. 6 shows the grunter 50 from the side, and the perforated endcap of the grunter 60 Again, the grunter makes sound during air intake when the toy returns to its resting state. The grunter will not make sound otherwise.

Figure 7:
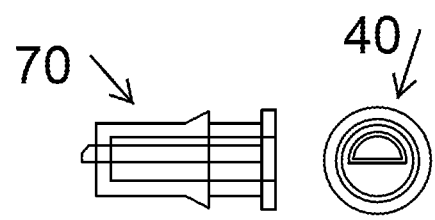
FIG. 7 illustrates the squeaker.

FIG. 7 shows the squeaker 40 in side perspective and the toning wedge portion of the squeaker 70 wherein only expulsion of air from the toy body activates the squeaker to produce sound.

The invention claimed is:

1. A pet toy comprising:
   a) A single piece plastic molded animal shaped toy body with the center of the toy being shaped like an accordion that allows air movement within and without the toy, wherein the toy is hollow;

b) One reed squeaker with toning wedge nested inside of a first tapered latex tube and inserted in an aperture in the head portion of the toy that creates a sound in response to air expelled from the hollow body of the toy;

c) One grunter nested into a second tapered latex tube and inserted in an aperture in the rear end of the toy body which creates a sound only in response to air being pulled into the toy therethrough;

d) An amount of Poly-fill material or batting inserted into the head and rear portion of the hollow toy body.

2. A pet toy as in claim 1 wherein the toy body is a single molded piece including the accordion middle section of the toy and wherein that section enfolds on itself during manual compression, and wherein air is extruded from the toy during compression.

3. A pet toy as in claim 1 wherein a single reed squeaker and a toning wedge are nested into a tapered latex tube and fixably inserted into an aperture therefor at the head of the toy.

4. A pet toy as in claim 1 wherein a single grunter noisemaker is nested into a tapered latex tube and fixably inserted into an aperture therefor at the rear of the toy.

5. A pet toy as in claim 1 wherein an amount of poly-fill material or batting is inserted into the head and rear portions of the toy prior to the squeaker and grunter being inserted through apertures created therefor.

\* \* \* \* \*